United States Patent [19]

Davis et al.

[11] 4,005,239
[45] Jan. 25, 1977

[54] DECORATIVE LAMINATED PANEL AND PROCESS FOR PREPARING THE SAME

[75] Inventors: Walter Thomas Davis; Peter Bernard Kelly, both of Cincinnati, Ohio

[73] Assignee: Formica Corporation, Cincinnati, Ohio

[22] Filed: Feb. 3, 1975

[21] Appl. No.: 546,479

Related U.S. Application Data

[63] Continuation of Ser. No. 306,973, Nov. 15, 1972, abandoned.

[52] U.S. Cl. .................... 428/315; 156/308; 156/309; 428/211; 428/339; 428/346; 428/354

[51] Int. Cl.² ............................ B32B 3/26

[58] Field of Search .......... 428/315, 320, 321, 314, 428/343, 346, 351, 354, 203, 211, 339, 310; 156/308, 309

[56] References Cited

UNITED STATES PATENTS

| | | | |
|---|---|---|---|
| 2,610,910 | 9/1952 | Thomson | 51/298 |
| 2,998,501 | 8/1961 | Edberg et al. | 156/79 |
| 3,420,021 | 1/1969 | Anghinetti et al. | 52/309 |
| 3,637,458 | 1/1972 | Parrish | 428/320 |

*Primary Examiner*—William J. Van Balen
*Attorney, Agent, or Firm*—James T. Dunn

[57] ABSTRACT

A decorative laminated panel and a process for making said panel comprising (1) coating the back most flat surface of a laminate with a uniform layer of a solution of an elastomeric adhesive and removing excess solvent, (2) coating one face of a compressible, flexible, closed cell polypropylene plastic foam sheet with a solution of an elastomeric adhesive and removing solvent, (3) superimposing the decorative laminate over said polypropylene plastic foam sheet with the adhesively coated side of the laminate facing the adhesively coated side of the polypropylene foam, (4) applying pressure to the flat surface of the laminate and plastic foam so as to form a unitary panel. To bond said decorative laminated panel to a substrate one can apply an elastomeric adhesive to the back of the panel and to a rigid substrate and installing the panel by pressing against the rigid substrate to which the panel is to be attached.

4 Claims, No Drawings

DECORATIVE LAMINATED PANEL AND PROCESS FOR PREPARING THE SAME

This is a continuation, of application Ser. No. 306,973, filed Nov. 15, 1972 now abandoned.

BACKGROUND OF THE INVENTION

For many years decorative high pressure laminates have been used as a surfacing material in residential and commercial structures where aesthetic effects are desired in combination with functional behavior, such as wear, heat and stain resistance. Typical applications are for walls, partitions, table tops, counter tops, furniture, doors and many other uses. These decorative laminates have been produced by a plurality of prior art processes. In making such laminates it is conventional to utilize a plurality of resin impregnated core sheets generally composed of kraft paper which have been impregnated with a thermosetting resin and more particularly as a general rule with a thermosetting phenolic resin. When the kraft has been impregnated with a thermosetting resin, the sheets are dried and cut to appropriate size. Thereupon, a plurality of these resin impregnated sheets are stacked in a superimposed relationship. The number of plies in the stack will depend upon the ultimate intended use of the laminate. For most purposes the number of these core sheets will total about 6 to 9. For decorative laminates there is then placed on the stack of core sheets a decorative sheet which is generally a sheet of alphacellulose paper bearing a printed design or a light color and impregnated with a noble thermosetting resin (see U.S. Pat. No. 3,373,068 and 3,418,189) which is not subject to any significant darkening upon the application of heat. Resins for the decorative sheets are the aminotriazine resins and additionally the unsaturated polyester resins, the epoxy resins and the like.

It is generally desirable when making decorative laminates to make use of a protective overlay sheet which is similar to the decorative sheet but generally devoid of design and in the final laminate is transparent. The laminates produced are heat and pressure consolidated to a unitary structure in which the press plate is a polished stainless steel plate. Such an approach produces a very smooth surface laminate with a glossy finish. Other techniques are used to produce laminates with a smooth surface but with a satin or brush textured effect. More recent techniques permit the manufacture of laminates with a three dimensional design on the surface.

These decorative laminates are usually bonded with an adhesive to a smooth surface rigid substrate such as plywood, particleboard, gypsum board, metal, cement and the like. Typical uses for the above is for applications such as partitions, walls, panels, doors, cabinets, table tops, counter tops, desks, furniture and many other uses.

Over the years the adhesives that have normally been used in bonding the aforementioned decorative laminate to substrates consist essentially of rigid, semi-rigid and the elastomeric types that have bonding properties which are compatible with the heat and pressure limitations of the laminate and capable of resisting humidity and temperature variations and induced stresses inherent in a bonded laminate to substrate assemblies, particularly in applications such as bathrooms and kitchens.

The rigid setting adhesives are those based usually on either urea-formaldehyde resins or resorcinol-formaldehyde resins and they produce excellent bonds and adequate water resistance. The adhesive is applied either to the back side of the laminate or the coating is applied to the substrate. These adhesives are usually hot set but can be used at room temperature.

The assembly is then either clamped or inserted in a veneer press and low pressure of approximately 25 psi is applied. These adhesives are considered "hot set" and will cure to excellent bonds by the application of heat of about 200° F. for 7 to 10 minutes. In the absence of heat, for example at room temperature conditions, satisfactory workable bonds are achieved under pressure in about 7 to 12 hours. "Workable" bond means that the panel may be trimmed, sawed and routed.

The semi-rigid adhesives encompass such materials as polyvinyl acetate emulsions, polyvinyl alcohol, epoxies and others.

Like the rigid type adhesives discussed above, the adhesive is either coated on the back of the laminate or on the substrate to be covered. Excellent bonds are achieved after subjecting the veneered assembly to clamp pressures or veneering equipment pressure for a period of 30 minutes up to about 8 hours at room temperature.

With the introduction of elastomeric adhesives some years ago and more specifically the "contact" type, which are solutions of rubbery polymers, it became possible to produce workable bonds almost instantly upon contact. Their ability to be processed rapidly and produce bonds without mechanical equipment justifies their use. Usually, pressure from a hand roller is all that is required to achieve excellent bonds. The use of "contact" type adhesive has significantly enlarged the scope of applications of high pressure decorative laminates such as had not been possible heretofore, namely, to on-site applications.

More recently products have appeared in the marketplace for on-site applications making use of a decorative laminate bonded to a plastic foam core. This type of product may be bonded with an elastomeric adhesive to a relatively non-smooth wall, such as ceramic tile, rough surface concrete and gypsum board. A panel of this type is light in weight, has good moisture resistance and because of the inherent nature of the foam, will bridge over substrate surface irregularities to the decorative surface of the laminate. However, panels and installations of the foregoing kind have certain shortcomings and leave much to be desired because of erratic or failure in bonding of the laminate to the plastic foam, as well as the plastic foam to the substrate, inadequate bridging of the substrate's surface irregularities leaving an unsightly, unpleasant and unattractive installation and stress cracking of the decorative surface from hardware cut-outs making a replacement necessary. These shortcomings have now been overcome.

FIELD OF THE INVENTION

This invention relates generally to construction materials and more particularly to a novel method of making panel structures. The invention also includes the panel structures themselves as products and their use thereof.

Panel structures formed from plastic foams and similar plastic-like materials are known in the art and have the advantage of relatively high strength to weight ratios. It is desirable that such panel structures are impervious to liquids, capable of withstanding hostile environmental conditions, be relatively fire resistant and yet easy to manipulate, form, cut and machine.

We have found a decorative surfaced plastic foam panel system which can be permanently bonded to rigid substrates in production or in on-site locations with a significant improvement in: (1) stress crack resistance, (2) impact resistance, (3) enhanced protection from the deleterious effects caused by moisture, and (4) a significantly improved bridging properties and bonding to a wall because the plastic foam core is compressible. This enables the panel to accommodate or bridge over irregular or rough substrate walls without telegraphing irregularities through to the surface of the laminate. This property endows the product with high efficiency in remodeling applications allowing installation directly over existing walls, including ceramic tile. The panel's compressibility also insures a very tight mating with moldings which are used in the installation. The moldings serve as a water seal, decorative finish for joints and edges and add to the restraint of panel stress.

DESCRIPTION OF THE PRIOR ART

The U.S. Pat. No. 3,420,021 discloses a decorative laminate bonded to a polystyrene foam core and is representative of the known prior art. From the standpoint of elastomeric adhesives of the solvent-type or emulsion-type, attention is directed to the following U.S. Pat. Nos.: 3,466,256; 3,044,976; 2,920,990; 2,918,442; 2,880,186; 2,879,252; 2,741,651; 2,685,576; and 2,610,910. From the standpoint of decorative laminates attention is directed to the following U.S. Pat. Nos.: 3,308,227; 3,313,675; 3,313,676; 3,340,137; 3,373,068; and 3,418,189. All of these patents are incorporated herein by reference.

SUMMARY OF THE INVENTION

This invention relates to a decorative laminated panel and to a process for making said panel comprising (1) coating the back most flat surface of a laminate with a uniform layer of an elastomeric adhesive solution and removing excess solvent, (2) coating one face of a compressible flexible closed cell polypropylene plastic foam sheet with an elastomeric adhesive solution and removing solvent, (3) superimposing the decorative laminate over the polypropylene plastic foam sheet with the adhesively coated side of the laminate facing the adhesively coated side of the polypropylene foam, (4) applying pressure to the flat surface of the laminate and plastic foam forming a unitary panel. To bond said decorative laminated panel to a substrate one can apply an elastomeric adhesive to the back of the panel and to a rigid substrate and installing the panel by pressing against the rigid substrate to which the panel is to be attached.

The following is a more detailed description of one embodiment of the process of the present invention.

One can apply uniformly a coating of an elastomeric neoprene based adhesive solution consisting of approximately a 20% solids of neoprene elastomer, phenolic resin and metallic oxides in an organic solvent, on to the back side of a 1/16 inch decorative plastic laminate and allowed to dry to a tack free film. The adhesive coating can be applied by any method yielding a coating that is uniform and constant in thickness and weight. The methods used to coat the back-most flat surface of the laminate can be anyone of the conventional coating techniques such as spraying, roller coating, curtain coating or the like. The adhesive is applied in an amount sufficient to provide between about 3.0 and 7.0 grams per sq. ft., dry weight. If desired one could use as little as 2 grams per sq. ft. of the adhesive, dry weight, but below this level questionable and erratic bonds would result. On the other hand, coatings of 8 grams are satisfactory but are unnecessary for effective bonding and the cost of additional adhesives raises the question of economics and makes the use of amounts in excess of 8 grams an unnecessary additional expense. A plurality of adhesives are suitable for our purpose and are commercially available such as the Formica Brands No. 130, 140, 150 and National Starch and Chemical Company's Bond Master No. 701.

Another type elastomeric adhesive which works equally well for coating the back of the laminate is a carboxylated styrene-butadiene polymeric rubber based adhesive which is commercially available from National Starch and Chemical Company of Bloomfield, New Jersey, is identified as MK-88C and described in U.S. Pat. No. 3,466,256. The adhesive is approximately 30% solids and contains, as the solvent medium, a mixture of hexane and heptane.

The laminate containing the dried adhesive coating may be protected against damage, during movement, distribution, storage or machining such as cutting to the appropriate size, by the application of a temporary protective cover. Among the protective covers that may be used are films of polypropylene, polyethylene, specially prepared parchment papers and similar release type films.

Then on to one broad face of a 3/32 inch thick compressible flexible closed cell polypropylene plastic foam layer is applied a uniform coating of the same adhesive and in the same amount as used for coating the back side of the decorative laminate as described hereinabove, and the coating is allowed to dry to a tack free film. The dried coating may also be protected against damage by using a temporary protective cover as before.

If desired more than one ply of the plastic foam could be bonded together in order to make thicker panels.

When the protective film is used on the back of the laminate and the back side of the plastic foam sheet, it is removed and the laminate and foam layer are joined by mating the two adhesive coated sides and passing through a pair of pressure rollers which apply a nip pressure, forming a unitary panel. Then on to the back most side of the panel is applied a uniform coating of a carboxylated styrenebutadiene polymeric rubber based elastomeric adhesive and allowed to dry to a tack free film of about 4.5 to 5.5 grams per sq. ft. dry basis. If desired one could use as little as 3.5 grams per sq. ft. of the dry adhesive, however below this level questionable and erratic bonds would result. Up to about 8 or 10 grams per sq. ft. of this dry adhesive could be used and would be satisfactory, but the question of economics enters the picture.

The coated back side of the panel may be protected as before with a removable protective release sheet such as 2 mil polyethylene.

Subsequently the protective film is removed from the back of the panel, the adhesive is reactivated with solvent and the panel is pressed to a substrate and appropriate moldings are affixed to the edges of the panel and secured to the substrate.

If one prefers, the adhesive coating on the back of the plastic foam panel may be omitted and instead a coating of an elastomeric mastic such as 3M Company's type EC-511 may be applied to the surface of the rigid substrate and the panel installed by pressing over the mastic coated wall.

The foam used is a relatively thin, compressible flexible, closed-cell polypropylene plastic foam sheet commercially available from DuPont as Microfoam Sheet. The product is available in thicknesses of 1/16 inch, 3/32 inch, ⅛ inch and ¼ inch and has the following properties shown in Table I hereinbelow.

rative plastic laminate with the back side of the laminate carrying the adhesive coating is faced towards and positioned directly over the side of the foam sheet carrying the adhesive coating. The laminate and foam sheet are joined by passing the assembly through a pair of rollers which applies nip pressure to permanently bond and unify the two components together forming a laminate foam composite hereinafter referred to as a panel, after which a commercially available carboxylated styrene-butadiene polymeric rubber adhesive solution, (MK-88C) is sprayed in a uniform coating onto the back side of the panel and allowed to dry to a tack

TABLE I

| PROPERTIES-<br>MECHANICAL, CHEMICAL | UNITS | VALUES | TEST METHODS |
| --- | --- | --- | --- |
| Density | lbs/ft$^3$ | 0.7 | |
| Tensile Strength | p.s.i. | MD 43<br>TD 21 | ASTM-D-828-60 |
| Elongation | Percent | 50–100 | ASTM-D-828-60 |
| Compression Set | Percent | 10 | DuPont Method (1/4" stack under 0.2 p.s.i. for 96 hrs. and 4 hr. recovery time; original and final thickness determined at 0.1 p.s.i.) |
| Compression under static load -<br>1/16" Microfoam | Percent | 0.2 psi 5.5<br>0.3 psi 9.5<br>0.4 psi 13.5 | DuPont Method - single ply |
| Transmission rates -<br>1/16" Microfoam<br>-Water | gm/100M$^2$/hr | 300 | DuPont Method |
| -Oxygen | cc/100 in$^2$/24 hr/atm | 1475 | ASTM-1434-66 (72° F., 0%, R.H.) |
| -Carbon Dioxide | cc/100 in$^2$/24 hr/atm | 5000 | ASTM-1434-66 (23° F., 50%, R.H.) |
| Dusting | Percent | 0–0.2 | *Method 4011, Procedure A |
| Abrasiveness | | None | *Method 4002 (No. 1100 H-24 Aluminum alloy) |
| Fungus resistance | | No active mold growth | MIL F-8261A |
| Contact corrosivity | | No induced corrosion | *Method 3005 (low-carbon steel) |
| Blocking | | None | *Method 3003, Procedure A (24 hrs, 160° F., 0 p.s.i. pressure plate) |
| Sealability | | Can be heat sealed on hot wire unit | |
| Water Absorption | lbs/ft$^2$ area | 0.001 | DuPont Method (after 3 hrs. under 1" of water; drained and blotted - single ply) |
| Dimensional stability | Percent | MD-2<br>TD-4 | DuPont Method (180° F., 4 hrs) |
| Flammability<br>-Burning rate | | **Self Extinguishing by this test | ASTM-D-1692 |

*FEDERAL TEST METHOD STANDARD No. 101
**No sample ignited - the foam melted and shrank from flame. Damage distance was never greater than 2 inches.

Many other foam sheets were evaluated for our panel product and found unsatisfactory for one or more reasons — some of these are polyethylene, polyurethane, and vinyl. The results are shown later in the Examples.

In order that the concept of the present may be more completely understood, the following examples are set forth. These examples are set forth primarily for the purpose of illustration and any specific enumeration of detail contained herein should not be interpreted as a limitation on the case, except as indicated in the appended claims.

EXAMPLE 1

A commercially available elastomeric neoprene based adhesive is sprayed in a uniform coating onto the sanded back side of a 48 inch × 96 inch × 1/16 inch thick decorative plastic laminate and the adhesive is allowed to dry to a tack free coating of 3.3 grams sq. ft. Then, onto one broad face of a commercially available 48 inch × 96 inch × 3/32 inch thick closed-cell polypropylene foam core sheet is sprayed a uniform coating of the aforementioned 130 type adhesive and allowed to dry to a tack free film of 3.3 grams sq. ft. The decofree coating of 5 to 6 grams/sq. ft. and is then protected from dirt and dust by two-mil polyethylene film. Enough of the above panels are made to conduct tests according to the following procedures:

TEST A

Panel Adhesion Screening Evaluation Test

The protective film is removed from the adhesively coated foam back of a 46 inch × 46 inch panel and a solvent coating of a solution of 90% trichloroethane and 10% solids carboxylated styrene-butadiene polymeric rubber adhesive is applied to the back with a paint roller. The reactivated adhesive film is permitted to dry. The proper adhesive tackiness is checked by pressing a thumb or finger firmly on the panel near a corner so that the adhesive grip is strong enough to allow finger adhesion to lift the corner panel six or eight inches without breaking the bond. The time required to achieve this condition will vary depending upon atmospheric conditions. However, in most cases a few minutes is all that is necessary. The panel is positioned over a 48 inch × 48 inch × ¾ inch thick plywood substrate having a ½ inch convex bow with the reactivated adhesive film facing the plywood substrate and bonding to the plywood by using a roller and applying pressure over the entire surface area. The panel is bonded to a convex bowed substrate in order to deliberately induce stresses within the adhesive film. The panel is tenaciously and permanently bonded to the plywood substrate. The panel and substrate is then subjected to atmospheric conditions in a room held at 10% relative humidity and 80° F. for two weeks, after which it is moved to another room maintained at 90% relative humidity and 80° F. for two weeks, and finally it is moved back to the first room held at 10% relative humidity for two more weeks. The panel and substrate is examined after each two week period and finally after a total of six weeks cycling, the panels are examined once more and it is found that the panel is tenaciously and permanently bonded to the plywood substrate. The results are shown in Table II.

TEST B

Immersion Tank Test

Another panel bonded to a plywood substrate is prepared in a manner substantially identical to the one prepared for the screening evaluation test except that a number of 2 inch × 3 inch test coupons are cut from the panel structure. These samples are immersed in a water bath maintained at 150° F. for fifteen minutes and then removed from the bath and permitted to air dry for forty-five minutes. The one hour cycle is repeated continuously for 96 hours. These samples are examined for any adhesive failure. The results are shown in Table II.

TEST C

Adhesive Bond Resistance to Delamination

This test is used to ascertain a number of properties for a suitable adhesive. Some of these are spread rate, film flow out, open dry requirements, initial grab, tack range and resistance to forceful delamination. 12 inch × 12 inch samples are cut from the panel made according to Example 1. The protective film is removed from the adhesively coated foam back and a solvent coating of a solution of 90% 1.1.1, trichloroethane and 10% solids of a carboxylated styrene-butadiene polymeric rubber adhesive is applied to the back. The reactivated adhesive film is allowed to dry and the tackiness is determined. The panel is then positioned over a 12 inch × 12 inch plywood substrate and bonded in place by using a roller to secure the panel to the plywood substrate. Immediately after bonding the assembly, the panel and substrate is subjected to a forceful delamination of the components. Failure occurred in several samples at the panel plywood interface by the fracturing of the plywood surface, establishing that the adhesive was stronger than the plywood substrate. On several other samples the delamination occurred within the foam layer near the foam and laminate interface. Here again the adhesive layer was stronger than the foam layer or had better than 95% contact. An acceptable adhesive must have more than 50% contact to be useful for our purpose. The results of this test are also shown in Table II.

TEST D

Radial Stress Crack Resistance

For many years users of decorative laminates have been faced with the problem of stress or radial cracking from cutout sections in a wall panel. Its occurrence is more likely to happen during winter months when heating systems reduce the moisture level of a dwelling or building from about 50 – 70% relative humidity to approximately 10% or less. Under low humidity conditions the laminate will lose moisture and contract dimensionally, creating stress areas around cutouts. This test is conducted in order to determine under simulated environmental conditions the stress crack resistance around wall cutouts for soap dishes, electrical boxes and the like in a decorative panel which has been bonded to a plywood substrate. A 48 inch × 48 inch panel is produced according to the procedure of Example 1 and then bonded to a plywood substrate as described hereinabove under the panel screening evaluation test except that in this test the plywood is flat and does not have a convex bow. A 4 inch × 4 inch hole is cut in the center of the panel structure and then the panel is moved to a room maintained at 10% relative humidity and 80° F. The panel structure is observed daily for a two week period for any evidence of cracks in the decorative surface particularly emanating from the corners of the cutout hole in the panel. The results of the test after two weeks are shown in Table II.

TEST E

Impact Resistance

Another panel bonded to a plywood substrate substantially identical to the one prepared for the panel adhesion screening evaluation under A above, is evaluated for impact resistance. A panel having high impact resistance is especially important for installations of panels along halls, corridor walls, and restrooms since these areas are frequently exposed to abuse from such articles as heavy buckets, floor cleaning and polishing machines, vacuuming equipment and other heavy equipment. A 2 inch diameter steel ball weighing 1.2 pounds is dropped on the decorative surface side of the panel structure from increasing heights beginning at 1 inch from the decorative surface until a fracture is observed on the surface. The results of the test are shown in Table II.

TEST F

A Shower Enclosure Performance Test

Three 30 inch × 60 inch panels bonded to plywood substrates substantially identical to the one prepared for the panel screening evaluation test A hereinabove is evaluated as an actual shower enclosure unit. Water at 150° F. from three shower heads is directed onto each wall for fifteen minutes. The water is shut off and the wall allowed to dry for 45 minutes under ambient atmospheric conditions. The one hour cycle is repeated on a continuous basis for 100 hours after which the walls are examined for any deleterious effects on the surface of the laminate or adhesive joints. The results are shown in Table II.

EXAMPLE 2

Example 1 is repeated in all details except that the panels for tests A, B, C, D, E and F are bonded to a ceramic tile substrate. The results are shown in Table II.

EXAMPLE 3

Example 1 is repeated in all essential details except that the panels for tests A, B, C, D, E and F are bonded to a water resistant gypsum board substrate. The results of the tests are shown in Table II.

EXAMPLE 4

Example 1 is repeated in all essential details except that the back of the decorative plastic laminate is sprayed with Formica brand type 150 adhesive. The results of the tests for A, B, C, D, E and F are shown in Table II.

EXAMPLE 5

Example 1 is again repeated in all essential details except that the back of the decorative plastic laminate is sprayed with Bondmaster 701 adhesive which is commercially available from National Starch & Chemical Co. The results of the tests are shown in Table II.

EXAMPLE 6

Example 5 is repeated in all essential detail except that Formica brand No. 140 adhesive is used in place of the MK-88C adhesive for bonding the panel to the plywood substrate, however, no solvent activation is necessary with this adhesive, but a coating of the adhesive is necessary on the substrate. The results of the tests A, B, C, D, E and F are shown in Table II.

Comparative EXAMPLE 7

Example 6 is repeated in all essential detail except that the polypropylene foam core is replaced with a commercially available comparatively rigid polystyrene foam that has kraft paper on both sides. The results of the tests A, B, C, D, E and F are shown in Table II. This panel is marginal to unsatisfactory because of low impact and the development of a plurality of stress cracks up to 20 inches long around the cutout hole.

EXAMPLE 8

Example 1 is repeated in all essential detail except that an elastomeric mastic adhesive available from 3M Company of St. Paul, Minnesota identified as EC-511 is used in place of the MK-88C adhesive. No solvent activation is necessary with this adhesive, but a coating of the adhesive is necessary on the substrate. The results of the tests for A, B, C, D, E and F are shown in Table II.

Comparative EXAMPLE 9

Example 1 is repeated in all essential detail except that the polypropylene foam core is replaced with a polystyrene foam which has kraft paper on both sides and a mastic adhesive is coated on the back side of the foam and then bonded to a plywood substrate. The results are shown in Table II. The laminate surface developed stress cracks at the corners of the cutout and was unsatisfactory because of low impact resistance.

EXAMPLE 10

Example 1 is repeated again in all essential details except that the Formica brand No. 130 adhesive on the back of the plastic laminate was replaced by using MK-88C adhesive. The test results are shown in Table II. An excellent panel structure was obtained.

COMPARATIVE EXAMPLE 11

Example 1 is repeated in all essential detail except that the MK-88C adhesive on the back side of the foam was replaced with a commercially available resorcinol resin adhesive. The adhesive does not require solvent reactivation but does require extended periods of time, temperature and pressure to achieve a satisfactory bond to the plywood substrate. The results are shown in Table II.

COMPARATIVE EXAMPLE 12

Example 1 is repeated in all essential detail except that the MK-88C adhesive is replaced on the back side of the Microfoam sheet with a polyvinyl acetate adhesive. The polyvinyl acetate has such poor moisture resistance that failure of the adhesive occurred. The panels were unsatisfactory for our purposes.

COMPARATIVE EXAMPLE 13

Example 12 is repeated in all essential details except that the panel was pressed against a ceramic tile substrate. The panel would not bond to the tile surface.

COMPARATIVE EXAMPLE 14

Example 12 is repeated in all detail except that a commercially available catalyzed polyvinyl acetate adhesive was used in place of the polyvinyl acetate adhesive. The panel was permanently bonded to the plywood substrate but required pressure of 25 psi for 18 hours.

COMPARATIVE EXAMPLE 15

Example 12 is repeated in all essential details except that a commercially available catalyzed polyvinyl acetate adhesive is used on the back of the panel. The panel was pressed against a ceramic tile substrate. The panel would not bond to the tile surface.

COMPARATIVE EXAMPLE 16

Example 1 is repeated in all essential detail except that a commercially available epoxy adhesive is used in place of the MK-88 adhesive and activator. The panels were bonded to a plywood substrate and were tenaciously and permanently affixed to the substrate. However, pressure has to be maintained on the panel for 6 hours in order to achieve a satisfactory bond. The results are shown in Table II.

COMPARATIVE EXAMPLE 17

Example 1 is repeated in all essential detail except that in place of the Microfoam sheet a commercially available polyethylene foam was used. The laminate would not bond to the plastic foam nor would the plastic foam bond to a plywood substrate. This plastic foam is not satisfactory for our purposes.

COMPARATIVE EXAMPLE 18

Example 1 is repeated in all essential detail except a polyethylene plastic foam which has been corona treated is used in place of the Microfoam sheet. The bonds of the laminate to the foam and the foam to a plywood substrate were weak and unsatisfactory.

COMPARATIVE EXAMPLE 19

Example 1 is repeated in all detail except that in this example an open cell polyurethane plastic foam was used in place of the Microfoam sheet. The adhesion of the laminate to the foam and the adhesion of the foam to the substrate was satisfactory, but the polyurethane plastic foam absorbed so much water that it was not useful for our purpose.

EXAMPLE 20

Example 20 is identical to Example 10 in all essential details except that 6 grams of MK-88C adhesive was coated on both sides of the 3/32 inch Microfoam core and no adhesive was coated on the 1/16 inch laminate. The laminate was bonded to one side of the Microfoam sheet by reactivating with MK-102A and nip pressure applied. The complete panel was then bonded to the substrate as described in Example 10. The results of the test were the same as Example 10.

EXAMPLE 21

Example 10 is repeated in all essential detail except that the Formica brand No. 130 adhesive on the back of the laminate was replaced by using MK-88 adhesive and no adhesive is applied to the surface of the Microfoam sheet. The laminate was bonded to one side of the Microfoam sheet by reactivating with MK-102A and nip pressure was applied.

The commercially available elastomeric adhesives disclosed hereinabove and used in various examples are, for the most part, elastomeric adhesives of the neoprene-thermosetting phenolic resin type in solvents. The Formica 130 adhesive is a spray type that comes in a solids content of about 30%. The Formica 150 adhesive is also a spray type that comes in about a 17% solids solution. The Formica 140 adhesive is a brush type that comes in about 20% solids solution. Bond Master 701 adhesion is also a spray type that comes in a 23% solids solution. The EC-511 adhesive is a mastic type adhesive dispersed in a solvent in about a 60% solids solution containing reclaimed rubber and is applied by use of a trowel. The MK-88 adhesive is a carboxylated styrene-butadiene polymeric rubber based adhesive and is almost colorless. The MK-88C is the same but is slightly colored. When the MK-88C is applied to the back most part of the foam surface to be bonded to the substrate and is dried and covered with a protective film, upon removal of the protective film the MK-88C layer needs to be reactivated and this is accomplished by reactivating the coating by wetting the same with a 10% solids solution of the carboxylated styrene-butadiene rubber adhesive dispersed in 1,1,1-trichloroethane. When this reactivation takes place the adhesive is identified as MK-88C/MK-102A. It has been indicated hereinabove that the elastomeric adhesive used in the present invention may be either the solvent type or the emulsion type but it is preferred to use the solvent type because of its better water resistance.

TABLE II

| Ex. | Panels Bonded to Substrates | Test A Screening Evaluation | Test B Immersion Test | Test C Contact Adhesion | Test D Radial Crack | Test E Impact | Test F Shower Performance | Comment |
|---|---|---|---|---|---|---|---|---|
| 1 | Surface-1/16" Laminate | | | | None | 48" | No Cracks | Excellent panel and installation |
| | Adhesive-FORMICA Brand 130 Elastomeric Neoprene Contact | T.B./N.L. | T.B./N.L. | 100% | | | T.B./N.L. | |
| | Core-Polypropylene Foam Adhesive-MK-88C/MK-102A | T.B./N.L. | T.B./N.L. | 95% | | | T.B./N.L. | |
| | Substrate-Water Resistant Type Plywood | | | | | | | |
| 2 | Surface-1/16" Laminate | | | | None | 42" | T.B./N.L. | Excellent panel and installation |
| | Adhesive-Formica Brand 130 | T.B./N.L. | T.B./N.L. | 100% | | | T.B./N.L. | |
| | Core-Polypropylene Foam Adhesive-MK-88C/MK-102A | T.B./N.L. | T.B./N.L. | 85% | | | T.B./N.L. | |
| | Substrate-Ceramic Tile | | | | | | | |
| 3 | Surface-1/16" Laminate | | | | None | 42" | No Cracks | Excellent panel and installation |
| | Adhesive-FORMICA Brand 130 | T.B./N.L. | T.B./N.L. | 100% | | | T.B./N.L. | |
| | Core-Polypropylene Foam Adhesive-MK-88C/MK-102A | T.B./N.L. | T.B./N.L. | 95% | | | T.B./N.L. | |
| | Substrate-Water Resistant Gypsum Board | | | | | | | |
| 4 | Surface-1/16" Laminate | | | | None | 48" | No Cracks | Excellent panel installation |
| | Adhesive-FORMICA Brand 150 | T.B./N.L. | T.B./N.L. | 100% | | | T.B./N.L. | |
| | Core-Polypropylene Foam Adhesive-MK-88C/MK-102A | T.B./N.L. | T.B./N.L. | 95% | | | T.B./N.L. | |
| | Substrate-Water Resistant Plywood | | | | | | | |
| 5 | Surface-1/16" Laminate | | | | None | 48" | No Cracks | Excellent panel and installation |
| | Adhesive-Bondmaster 701 | T.B./N.L. | T.B./N.L. | 100% | | | T.B./N.L. | |
| | Core-Polypropylene Foam Adhesive-MK-88C/MK-102A | T.B./N.L. | T.B./N.L. | 95% | | | T.B./N.L. | |
| | Substrate-Water Resistant Plywood | | | | | | | |
| 6 | Surface-1/16" Laminate | | | | None | 48" | No Cracks | Excellent panel and installation |
| | Adhesive-Bondmaster 701 | T.B./N.L. | T.B./N.L. | 100% | | | T.B./N.L. | |
| | Core-Polypropylene Foam Adhesive-FORMICA Brand 140 | T.B./N.L. | T.B./N.L. | 80% | | | T.B./N.L. | |
| | Substrate-Water Resistant Plywood | | | | | | | |
| 7 | Surface-1/16" Laminate | | | | 2 Cracks of 20" | 12" | 2 Cracks | Laminate cracks at rough machined corners and low impact make this panel least desirable for panel system application. |
| | Adhesive-Bondmaster 701 | T.B./N.L. | T.B./N.L. | 100% | | | T.B./N.L. | |
| | Core-Polystyrene Foam | | | | | | | |
| | Adhesive-FORMICA Brand 140 | T.B./N.L. | T.B./N.L. | 70% | | | T.B./N.L. | |

TABLE II-continued

| Ex. | Panels Bonded to Substrates | Test A Screening Evaluation | Test B Immersion Test | Test C Contact Adhesion | Test D Radial Crack | Test E Impact | Test F Shower Performance | Comment |
|---|---|---|---|---|---|---|---|---|
| 8 | Substrate-Water Resistant Plywood Surface-1/16" Laminate | | | | None | 38" | No Cracks | Excellent panel and installation |
| | Adhesive-FORMICA Brand 130 | T.B./N.L. | T.B./N.L. | 100% | | | T.B./N.L. | |
| | Core-Polypropylene Foam Adhesive-Mastic | T.B./ 1/32" L. | T.B./ .010" L. | 75% | | | T.B./ 1/32" L. | |
| 9 | Substrate-Water Resistant Plywood Surface-1/16" Laminate | | | | 2 Cracks | 12" | 2 Cracks | Laminate cracks at rough machined corners and low impact make this panel least desirable for panel system application. |
| | Adhesive-FORMICA Brand 130 | T.B./N.L. | T.B./N.L. | 100% | | | T.B./N.L. | |
| | Core-Polystyrene Foam | 1/4" L. | | | | | | |
| | Adhesive-Mastic Substrate-Water Resistant Plywood | | .020" L. | 60% | | | 1/4" L. | |
| 10 | Surface-1/16" Laminate | | | | None | 48" | No Cracks | Excellent panel and installation |
| | Adhesive-MK-88C | T.B./N.L. | T.B./N.L. | 100% | | | T.B./N.L. | |
| | Core-Polypropylene Foam Adhesive-MK-88C/MK-102A Substrate-Water Resistant Plywood | T.B./N.L. | T.B./N.L. | 95% | | | T.B./N.L. | |
| 11 | Surface-1/16" Laminate | | | | None | 38" | | Although resorcinol type adhesives will bond a polypropylene cored panel assembly to building substrates, they require pressure over an extended period of time, whereas elastomeric adhesives will bond within a few minutes of adhesive application with only momentary pressure. |
| | Adhesive-FORMICA Brand 130 | T.B./N.L. | T.B./N.L. | | | | | |
| | Core-Polypropylene Foam | | | | | | | |
| | Adhesive-Resorcinol Resin Type | T.B./N.L. | T.B./N.L. | 100% | | | | |
| | Substrate-Water Resistant Plywood | | | | | | | |
| 12 | Surface-1/16" Laminate Adhesive-FORMICA Brand 130 | T.B./N.L. | T.B./N.L. | | | | | *PVA has poor moisture resistance and failure of test panel assembly occurred in high humidity and water bath. |
| | Core-Polypropylene Foam | | | | | | | |
| | Adhesive-PVA | *Failure | *Failure | | | | | |
| | Substrate-Water Resistant Plywood | | | | | | | |
| 13 | Surface-1/16" Laminate | | | | | | | *PVA is a water based system which proved unsatisfactory in bonding closed cell polypropylene foam non-porous ceramic tile glazed faces. |
| | Adhesive-FORMICA Brand 130 | T.B./N.L. | | | | | | |
| | Core-Polypropylene Foam | | | | | | | |
| | Adhesive-PVA | *No Bond | | | | | | |
| | Substrate-Ceramic Tile | | | | | | | |
| 14 | Surface-1/16" Laminate | | | | None | 38" | | *Although catalyzed PVA will bond a propylene cored panel assembly to porous building substrates, they require pressure for an extended period of time, whereas elastomeric adhesives will bond within a few minutes with only momentary pressure. |
| | Adhesive-FORMICA Brand 130 | T.B./N.L. | T.B./N.L. | 100% | | | | |
| | Core-Polypropylene Foam | | | | | | | |
| | Adhesive-Catalyzed PVA | T.B./N.L. | T.B./N.L. | 100% | | | | |
| | Substrate-Water Resistant Plywood | | | | | | | |
| 15 | Surface-1/16" Laminate | | | | | | | *Although a catalyzed PVA, this adhesive is water based and does not cure properly between non-porous surfaces. |
| | Adhesive-FORMICA Brand 130 | T.B./N.L. | | | | | | |
| | Core-Polypropylene Foam | | | | | | | |
| | Adhesive-Catalyzed PVA | *No Bond | | | | | | |
| | Substrate-Ceramic Tile | | | | | | | |
| 16 | Surface-1/16" Laminate | | | | *None | 38" | | *Although epoxy adhesives will bond a polypropylene cored panel assembly to building substrates, they require pressures for an extended period of time, whereas elastomeric |
| | Adhesive-FORMICA Brand 130 | T.B./N.L. | T.B./N.L. | 100% | | | | |
| | Core-Polypropylene Foam | | | | | | | |
| | Adhesive-Epoxy type | T.B./N.L. | T.B./N.L. | 100% | | | | |
| | Substrate-Water Resistant Plywood | | | | | | | |

TABLE II-continued

| Ex. | Panels Bonded to Substrates | Test A Screening Evaluation | Test B Immersion Test | Test C Contact Adhesion | Test D Radial Crack | Test E Impact | Test F Shower Performance | Comment |
|---|---|---|---|---|---|---|---|---|
| 17 | Surface-1/16" Laminate | | | | | | | adhesives will bond within a few minutes with only momentary pressure. *Adhesives would not bond to polyethylene foam. |
| | Adhesive-FORMICA Brand 130 | *No Bond | | | | | | |
| | Core-Polyethylene Foam | | | | | | | |
| | Adhesive-MK-88C/MK-102A | | | | | | | |
| | Substrate-Water Resistant Plywood | | | | | | | |
| 18 | Surface-1/16" Laminate | | | | | | | *Although a partial bond was established, the bond was eratic. Economics were not satisfactory. |
| | Adhesive-FORMICA Brand 130 | *Partial Bond | | | | | | |
| | Core-Polyethylene Foam (Corona Treated) | | | | | | | |
| | Adhesive-MK-88C/MK-102A | *Partial Bond | | | | | | |
| | Substrate-Water Resistant Plywood | | | | | | | |
| 19 | Surface-1/16" Laminate | | | | | | | *Although adhesion was good, foam absorbed water which does not satisfy panel composition requirements in high moisture content use areas. |
| | Adhesive-FORMICA Brand 130 | *T.B./N.L. | *T.B./N.L. | | | | | |
| | Core-Polyurethane (Open Cell) | | | | | | | |
| | Adhesive-MK-88C/MK-102A | *T.B./N.L. | *T.B./N.L. | | | | | |
| | Substrate-Water Resistant Plywood | | | | | | | |
| 20 & 21 | Surface-1/16" Laminate | | | | None | 48" | No Cracks | Excellent panel and installation. |
| | Adhesive-MK-88C/MK-102A | T.B./N.L. | T.B./N.L. | 100% | | 48" | T.B./N.L. | |
| | Core-Polypropylene Foam | | | | | | | |
| | Adhesive-MK-88C/MK-102A | T.B./N.L. | T.B./N.L. | 95% | | | T.B./N.L. | |
| | Substrate-Water Resistant Plywood | | | | | | | |

T.B. = Tightly Bonded
N.L. = No Lifting of Edges
L. = Lifting of Edges

We claim:

1. A decorative laminate foam panel comprising a heat and pressure consolidated decorative laminate adhesively bonded to a compressible, flexible, closed-cell, polypropylene plastic foam sheet by means of a uniform layer of an elastomeric adhesive wherein said heat and pressure consolidated decorative laminate is comprised of a plurality of paper core sheets impregnated with a thermosetting phenolic resin and surfaced with a decorative sheet which is impregnated with a noble thermosetting resin, each of said resins having been converted to the thermoset state during heat and pressure consolidation and wherein said foam sheet is bonded to the back flat surface of said laminate, the decorative side of said laminate is on the reverse side of said back surface and the back most surface of said panel is coated with a uniform layer of an elastomeric adhesive.

2. A decorative laminate foam panel according to claim 1 in which the elastomeric adhesive is a blend of a neoprene elastomer, a phenolic resin, metallic oxides in an organic solvent.

3. A decorative laminate foam panel according to claim 1 in which the density of said compressible closed cell polypropylene foam sheet in an uncompressed state is about 0.7 lb. per cubic foot.

4. A decorative laminate foam panel according to claim 1 in which the thickness of said compressible, closed cell, polypropylene foam sheet is between about 0.05 inch and about 0.5 inch.

* * * * *